June 4, 1935.   A. R. FINCH   2,003,432
MOLD
Filed April 4, 1934
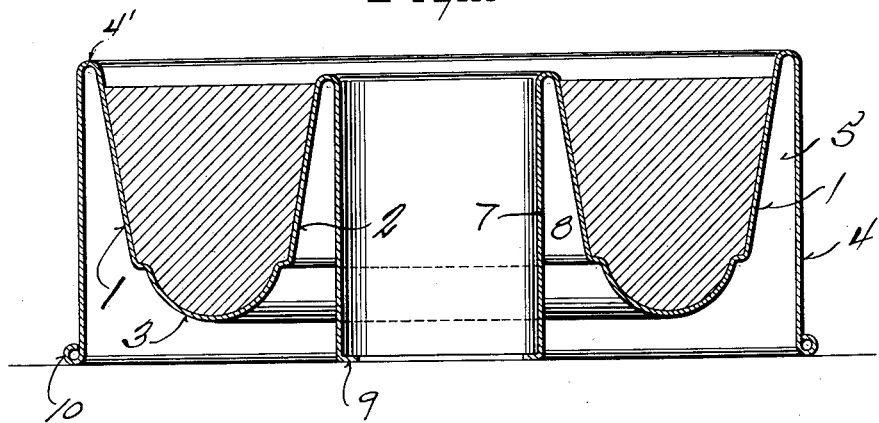
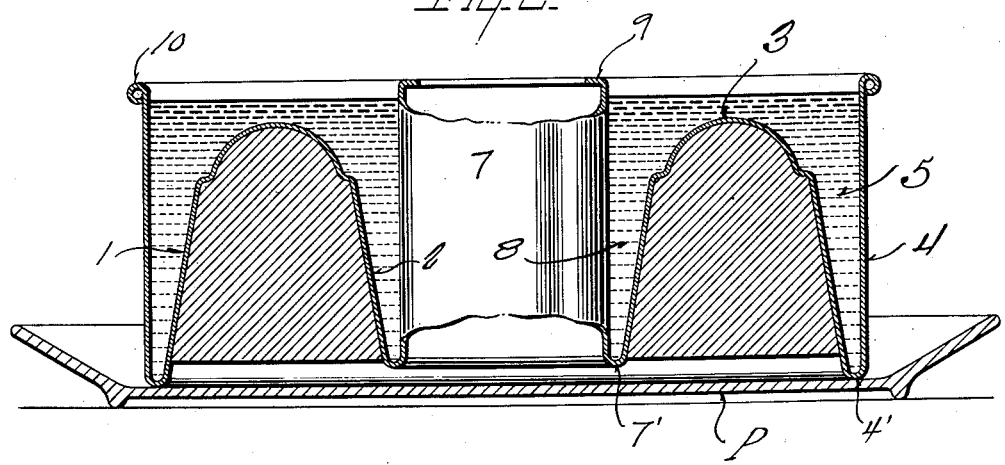
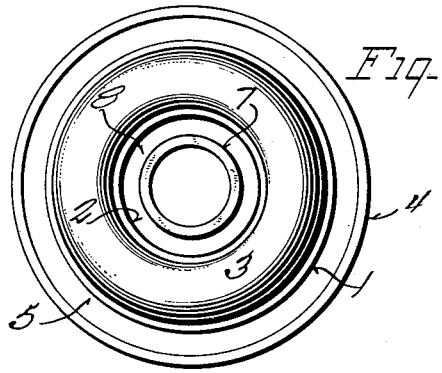
INVENTOR.
Arnold R. Finch
BY
Bottume, Hudnall, Leslie,
McNamara & Michael
ATTORNEYS Patented June 4, 1935

2,003,432

UNITED STATES PATENT OFFICE 2,003,432

MOLD

Arnold R. Finch, West Bend, Wis., assignor to West Bend Aluminum Co., West Bend, Wis., a corporation of Wisconsin Application April 4, 1934, Serial No. 718,898

4 Claims. (Cl. 107—19)

This invention relates to an improvement in molds of the type which may be advantageously employed for molding jellos, salads, or the like.

One of the principal objects of this invention is to provide a mold of this character which is so constructed and organized as to facilitate the clean and easy removal from the mold cavity of the molded contents after the same has set. Usually, it has been the practice to attempt to release the molded salad or jello from the mold by running a knife between the molded material and the accessible walls of the mold cavity but some portions of these walls are not accessible and consequently the molded material frequently sticks and must be pried at and jogged with consequent inconvenience and, in some instances, breakage of the molded article or impairment of its appearance.

With the present invention, the mold is so constructed that chambers are provided on the opposite sides of all of the walls of the mold cavity so that after the molded material has set the mold may be inverted and placed over a plate and hot water or other heating fluid may be poured into such chambers to heat up the walls of the mold and consequently soften the surfaces of the molded material where they contact with such walls. Thereupon the molded material drops cleanly from the mold onto the plate.

Another object is to provide a mold having these advantages and capacities and which is simple and durable in its construction, attractive in appearance and easy and comparatively inexpensive to manufacture and this from materials and by means of facilities ordinarily available.

Other objects and advantages reside in certain novel features of the construction, arrangement and combination of parts which will be hereinafter more fully described and particularly pointed out in the appended claims, reference being had to the accompanying drawing, forming a part of this specification, and in which:

Figure 1 is a view partly in section and partly in elevation showing a mold constructed in accordance with the present invention, and in its ordinary upright position;

Figure 2 is a view similar to Figure 1 but showing the mold inverted and positioned on a plate to provide for discharge of the molded contents from the mold cavity; and Figure 3 is a view in bottom plate further illustrating the mold construction.

Referring to the drawing, it will be seen that the mold embodying the present invention includes a pair of spaced circular walls 1 and 2 connected at their lower ends by a bottom wall 3 to define a mold cavity of appropriate contour and open at its top. The wall 1 is integrally connected around its upper circular edge by a suitable bend 4' with a cylindrical wall 4 which serves to aid in the support of the mold and also coacts with the adjacent outer mold wall 1 to define a water receiving chamber 5. Similarly, the inner mold wall 2 has its upper circular edge connected by a suitable bend 7' to the upper end of an inner cylindrical wall section 7 which aids in supporting the mold and which coacts with the wall 2 to define a water receiving chamber 8. The lower edge of the cylindrical section 7 may be provided with an inturned flange 9 and the corresponding edge of the outer wall 4 with a rolled bead 10 to provide suitable structure for engaging the surface on which the mold ordinarily rests. In the inverted position of the mold the bends 4' and 7' perform a similar function.

In using the mold, it is positioned as shown in Figure 1, and the mold cavity is readily accessible so that the material to be molded may be poured thereinto. After the material is molded and set the mold is inverted and placed on a plate P, as shown in Figure 2. Hot water or other heated fluid may then be poured into or otherwise placed in the chambers 5 and 8 until it completely covers the walls 1 and 2 and also the bottom wall 3. The result is that the surfaces of the mold material contacting with and adhering to the walls 1, 2 and 3 are softened and the material drops intact onto plate P. Difficulties in removing the molded object or the necessity of prying or mutilating the same are avoided. The device is easily handled and its operation may be readily understood by any housewife or domestic servant.

While I have shown and described one construction in which the invention may be embodied, it is to be understood that the construction illustrated has been selected merely for the purposes of illustration and example and that various changes in the size, shape and arrangement of the parts may be made without departing from the spirit of the invention or the scope of the subjoined claims.

The invention claimed is:

1. A mold comprising a bottom, and inner and outer mold side walls connected to the bottom, and inner and outer peripheral walls connected to said side walls and cooperable therewith when the mold is inverted to provide chambers adapted to contain a heated fluid, said chambers in heat exchanging relation with the interior of the mold.

2. A mold made up of a pair of circular walls connected at their lower ends to define a mold cavity which is open at its top, and means coacting with both of said walls to provide chambers when the mold is inverted, said chambers being in heat exchanging relation with the interior of said mold cavity.

3. A mold made up of a pair of walls connected at their lower ends to provide a mold cavity open at its top and inner and outer peripheral walls connected with said pair of walls, and coacting therewith to provide chambers designed to receive a heated fluid when the mold is inverted.

4. A mold comprising spaced side walls and a bottom connecting said side walls to define therewith a mold cavity, the upper end of said cavity being open, an outer cylindrcal wall connected to the outer side wall of the mold cavity and extending down to a point below the bottom wall thereof, and an inner cylindrical wall connected to the inner wall of the mold cavity at the upper end thereof and also extending down to a point below the bottom of the mold cavity.

ARNOLD R. FINCH.